US012367740B2

(12) United States Patent
Ascheri-Phillips et al.

(10) Patent No.: US 12,367,740 B2
(45) Date of Patent: Jul. 22, 2025

(54) SYSTEMS AND METHODS FOR TICKET AND CASHLESS MERCHANT DISCOUNT OFFERS

(71) Applicant: IGT, Las Vegas, NV (US)

(72) Inventors: Samantha Ascheri-Phillips, Reno, NV (US); Patrick Danielson, Las Vegas, NV (US); Dwayne Nelson, Las Vegas, NV (US)

(73) Assignee: IGT, Las Vegas, NV (US)

( * ) Notice: Subject to any disclaimer, the term of this patent is extended or adjusted under 35 U.S.C. 154(b) by 16 days.

(21) Appl. No.: 17/892,664

(22) Filed: Aug. 22, 2022

(65) Prior Publication Data

US 2022/0406137 A1 Dec. 22, 2022

Related U.S. Application Data

(63) Continuation of application No. 16/294,076, filed on Mar. 6, 2019, now Pat. No. 11,450,175.

(51) Int. Cl.
*G07F 17/32* (2006.01)

(52) U.S. Cl.
CPC ........ *G07F 17/3244* (2013.01); *G07F 17/323* (2013.01); *G07F 17/3267* (2013.01); *G07F 17/3288* (2013.01)

(58) Field of Classification Search
None
See application file for complete search history.

(56) References Cited

U.S. PATENT DOCUMENTS

2008/0139306 A1 6/2008 Lutnick et al.
2008/0167106 A1 7/2008 Lutnick et al.
2013/0079134 A1* 3/2013 Walker .................... G07F 17/32 463/31
2014/0018155 A1* 1/2014 Nelson ................ G07F 17/3211 463/25
2014/0066185 A1 3/2014 Marantelli
2014/0087861 A1* 3/2014 Basallo ................... G07F 17/32 463/29

* cited by examiner

*Primary Examiner* — Reginald A Renwick
(74) *Attorney, Agent, or Firm* — Sage Patent Group

(57) ABSTRACT

Provided are systems for providing ticket and cashless discount offers. As system includes a processor circuit that receives, from a player, a request for a cashout that corresponds to a cash balance held by the player at the end of a gaming session. A cashout bonus status that corresponds to the player and to the gaming session is determined. A bonus portion that is based on the cashout bonus status and the cash balance is determined. The system transmits an offer message to the player. The offer message includes an offer to allocate the bonus portion and the cash balance to be spent with a predefined vendor that is associated with a game provider. If the player accepts the offer, the bonus portion and at least a portion of the cash balance are transferred to an account that is associated with the player and the predefined vendor.

14 Claims, 5 Drawing Sheets

SYSTEMS AND METHODS FOR TICKET AND CASHLESS MERCHANT DISCOUNT OFFERS

CROSS REFERENCE TO RELATED APPLICATIONS

This application is a continuation of, and claims priority to and the benefit of, U.S. patent application Ser. No. 16/294,076, which was filed Mar. 6, 2019, the disclosure and content of which is incorporated by reference herein in its entirety.

BACKGROUND OF THE DISCLOSURE

Embodiments described herein relate to systems, methods and computer program products for providing ticket and cashless merchant discount offers from wagering game balances.

In wagering gaming environments, casino games including electronic gaming machines (EGM) and table games, electronic or otherwise, may provide remaining balances for players at the end of a gaming session. For example, providing a balance to a player may be performed wirelessly by transmitted the funds to a player's electronically available account. Such accounts may be accessed using cards and/or may be cardlessly connected using a player's electronic mobile device. Alternatively, a player may receive a machine readable ticket that may be redeemed for cash at a cashout kiosk or other type device. Once the balance is removed from the cardless connect account or the ticket is redeemed for cash, the player may be lured to other venues to spend the redeemed cash. Further, such redemptions cause larger quantities of cash to be moving throughout the location, which may provide increased opportunities for criminal enterprises to exploit players.

BRIEF SUMMARY OF THE DISCLOSURE

Some embodiments of the inventive concept are directed to a gaming system that includes a processor circuit and a memory coupled to the processor circuit. The memory includes machine-readable instructions that, when executed by the processor circuit, cause the processor circuit to determine a cashout bonus status that corresponds to a player of a gaming session and to determine a bonus portion that is based on the cashout bonus status and a cash balance. The processor circuit may transmit an offer message to a device that is viewable by the player that comprises an offer to allocate a value of a portion of the bonus portion and the cash balance to be spent with a predefined vendor that is associated with a game provider that provided a game being executed to provide the gaming session and, responsive to receiving an acceptance of the offer from the player, the processor circuit may be cause to transfer the value to an account that is associated with the player and the predefined vendor.

Some embodiments disclosed herein are directed to a computer-implemented method of operating a gaming system. The method includes operations of receiving, from a player, a request for a cashout that corresponds to a cash balance of the player at the end of a gaming session that is provided by a game provider, determining a cashout bonus status that corresponds to the player and to the gaming session, determining a bonus portion that is based on the cashout bonus status and the cash balance, and transmitting an offer message to a device that is viewable by the player.

The offer message includes an offer to allocate the bonus portion and a portion of the cash balance to be spent with a predefined vendor that is associated with the game provider.

Some embodiments disclosed herein are directed to a device that includes a processor circuit and a memory coupled to the processor circuit. The memory includes machine-readable instructions that, when executed by the processor circuit, cause the processor circuit to determine that an account that is associated with a player includes a cash balance after a gaming session that is provided by a game provider is ended, transmit an offer message to a device that is viewable by the player. The offer message includes an offer to allocate a bonus portion and a portion of the cash balance to be spent with a predefined vendor that is associated with the game provider. The processor circuit further, responsive to receiving an acceptance of the offer from the player, causes the transfer the bonus portion and the portion of the cash balance to a predefined vendor account that is associated with the player.

DETAILED DESCRIPTION OF THE DISCLOSURE

Embodiments of the inventive concepts provide systems and methods for providing ticket and cashless merchant discount offers. The systems and methods herein provide technical solutions to the problem of players spending winnings at other locations and large amounts of cash moving throughout a given location. For example, embodiments disclosed herein provide that when a player cashes out using a physical ticket or virtually transfers to a cardless connect account through a mobile device, the property may keep track of the recent play session and offer discounts and other services when redeeming the ticket.

Based on a cashout bonus status that may be based on the player status and/or data corresponding to the gaming session, a bonus may be added to the balance that may be used to provide discounts on purchases of goods and/or services on the location of the gaming operator.

Figure 1:
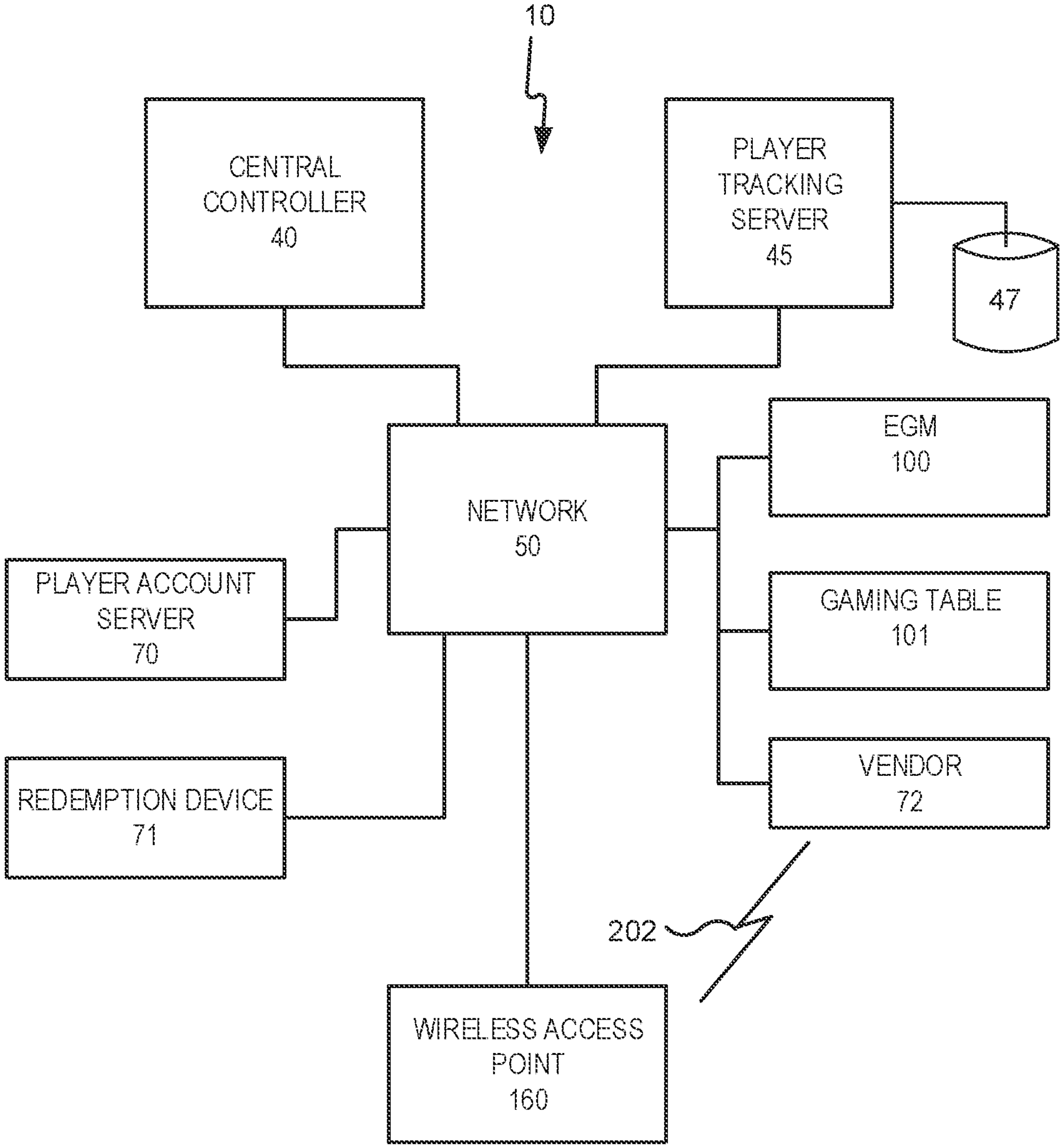
FIG. 1 is a schematic block diagram illustrating a network configuration for a gaming devices according to some embodiments.

Referring to FIG. 1, a gaming system 10 including an EGM 100 is illustrated. The gaming system 10 may be located, for example, on the premises of a gaming establishment, such as a casino. The EGM 100, which may typically be situated on a casino floor, may be in communication with other EGMs 100 and/or at least one central controller 40 through a data network or remote communication link 50. The data communication network 50 may be a private data communication network that is operated, for example, by the gaming facility that operates the EGM 100.

The gaming system 10 may include a table game 101 that may typically be situated on a casino floor, may be in communication with EGMs 100, other table games 101 and/or at least one central controller 40 through a data network or remote communication link 50. Table games 101 may include conventional wagering table games that may be configured to track and store player activity during a gaming session and/or electronic table games (ETG) that include one or more processors and interact with the player via displays and/or user interfaces.

Communications over the data communication network 50 may be encrypted for security. The central controller 40 may be any suitable server or computing device which includes at least one processor and at least one memory or storage device. Each EGM 100 and/or table game 101 may include a processor that transmits and receives events, messages, commands or any other suitable data or signal between the EGM 100 and/or table game 101 and the central controller 40. The EGM processor or table game processor is operable to execute such communicated events, messages or commands in conjunction with the operation of the EGM 100 and/or table game 101. Moreover, the processor of the central controller 40 is configured to transmit and receive events, messages, commands or any other suitable data or signal between the central controller 40 and each of the individual EGMs 100 and/or table games 101. In some embodiments, one or more of the functions of the central controller 40 may be performed by one or more EGM and/or table game processors. Moreover, in some embodiments, one or more of the functions of one or more EGM processors and/or table game processors as disclosed herein may be performed by the central controller 40.

A wireless access point 160 provides wireless access to the data communication network 50. The wireless access point 160 may be connected to the data communication network 50 as illustrated in FIG. 1, or may be connected directly to the central controller 40 or another server connected to the data communication network 50.

A player tracking server 45 may also be connected through the data communication network 50. The player tracking server 45 may manage a player tracking account that tracks the player's gameplay and spending and/or other player preferences and customizations, manages loyalty awards for the player, manages funds deposited or advanced on behalf of the player, and other functions. Player information managed by the player tracking server 45 may be stored in a player information database 47.

In some embodiments, the gaming system 10 includes a player account server 70. The player account server 70 may be a computing system that communicates through the data communication network 50 with a redemption device 71, the player tracking server 45 and/or a vendor 72. The redemption device 71 may include a dedicated hardware that may be located, for example, in a casino. Some embodiments provide that the redemption device 72 includes a kiosk that may be used to redeem tickets and/or balances from carded and/or cardless connected accounts.

In some embodiments, the redemption device 71 may communicate with the player account server 70 to determine account balances and other data corresponding to one or more gaming sessions in response to the player requesting a cashout of the ticket or otherwise connected account. The player account server 70 may determine a cashout bonus status corresponding to the ticket or connected account to determine if the player qualifies for a bonus based on the gaming activity. For example, wagering activity in a recent gaming session and/or the player's historical gaming behavior may be considered to determine the bonus. Wagering activity may include number of bills inserted during a gaming session, number of wagers made during the betting session, amounts of wagers during the gaming session, and wins and losses, among others.

If the player cashout bonus status meets minimum requirements for bonus eligibility, then the player account server 70 may determine a bonus portion that may be offered to the player. The bonus portion may be based on the cashout bonus status and the cash balance corresponding to the ticket and/or in the account.

Once the bonus portion is determined, the player account server 70 may transmit or cause to be sent an offer message to the player. In some embodiments, the offer message is sent to a mobile device that is associated with the player. Some embodiments provide that the offer message is displayed to the player at the redemption device 71. The offer message may include an offer to the player to allocate the bonus portion and at least a portion of the cash balance to be spent with a vendor 72. By combining a portion of the cash balance with a bonus portion to spend with the vendor, the player receives a discount on the gods and/or services provided by the vendor 72. In some embodiments, the vendor 72 is a predefined vendor based on a location and/or business relationship with the gaming establishment. For example, the vendor 72 may be a merchant that includes a presence that is located on the property corresponding to the gaming establishment, including casino boutiques, stores and/or restaurants.

While some embodiments provide that the bonus portion may be defined as a specific amount to spend with the vendor 72, other embodiments provide that the bonus portion may be a discount that is based on a percentage of the purchased goods and/or services. Examples include significant discounts at a kiosk for gift cards or other value bearing instruments that may be redeemed with merchants that are not on at the gaming establishment property.

In some embodiments, the bonus portion may include discounts for large ticket items such as a vehicle that may be purchased at or through dealerships that may be specifically designated. Some embodiments provide that gift cards may be specific to vendors 72 such as online merchants.

Figure 2:
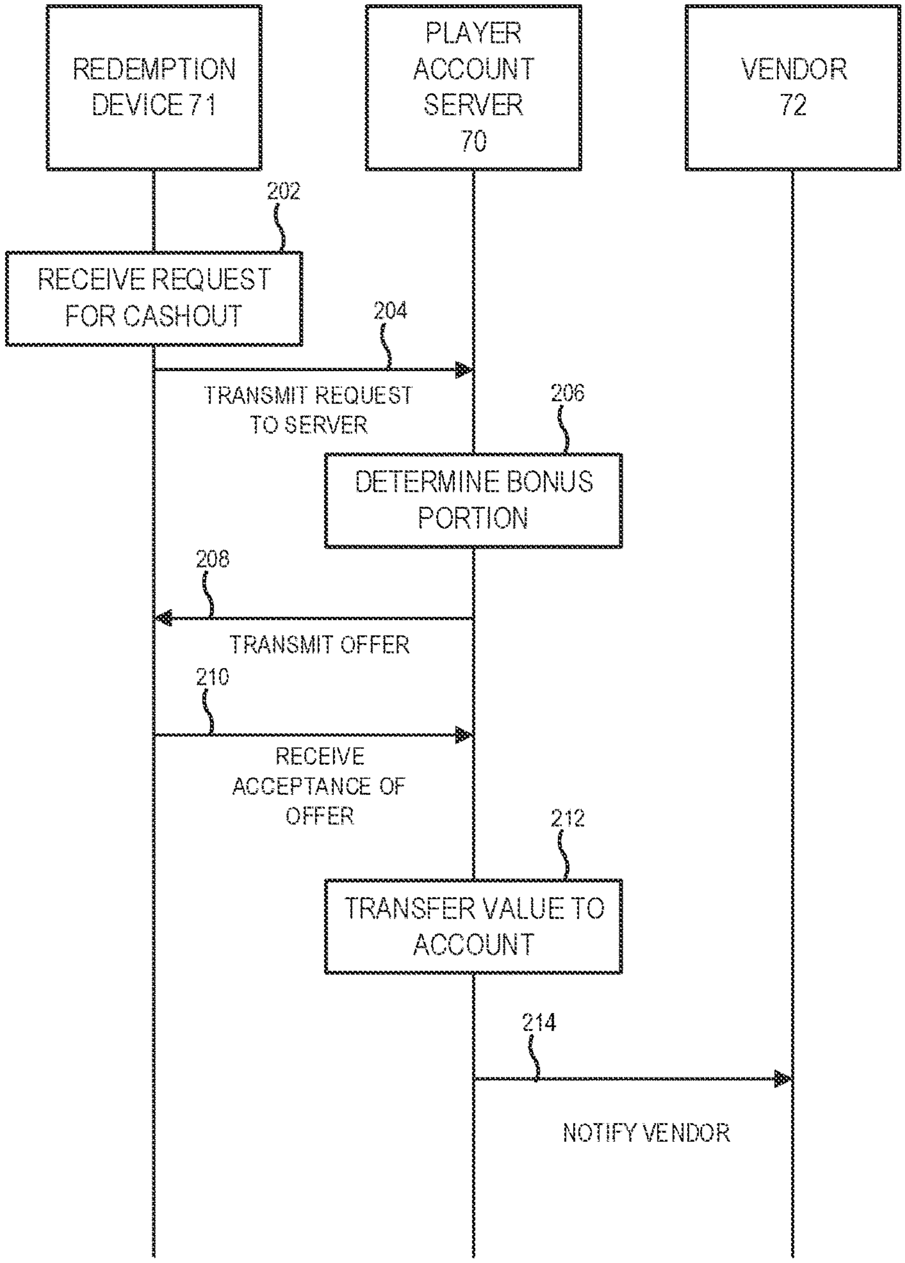
FIG. 2 is a flow diagram illustrating data flows according to some embodiments.

Reference is now made to FIG. 2, which is a flow diagram illustrating data flows according to some embodiments. A request for cashout may be received from a player by the redemption device 71 (block 202). In response to receiving the cashout request, the redemption device 71 may transmit 204 the request for cashout to the player account server 70. In response to receiving the request for cashout, the player account server 70 may determine a cashout bonus portion (block 206). The cashout bonus portion may be determined based on a cashout bonus status that may be determined by the player account server 70 and that corresponds to the player and/or a recent gaming session. For example, a cashout bonus status may determine that a player is not eligible for a bonus portion if the player's recent gaming session was not long enough, if the player's wagering frequency and/or amounts did not meet minimum thresholds, and/or if the player's historical wagering behavior does not meet specific requirements.

In addition to considering the cashout bonus status, the bonus portion may further be based on the cash balance that the player is requesting to redeem. For example, larger cash balances may provide that the bonus portion is larger than may be available for a small cash balance. The bonus portion may include an available amount to be spent, in combination with a portion of the cash balance on goods and/or services that are provided by a predefined vendor 72. In some embodiments, the bonus portion may be a discount on purchases made with the predefined vendor 72. The discount may be a percentage of the purchase price of the goods and/or services and/or may be a fixed discount that corresponds to specific amounts spent and/or to specific items purchased.

Once the bonus portion is determined, the player account server 70 may transmit 208 an offer to the player that includes the bonus portion. In some embodiments, the offer is transmitted to the player via the redemption device 71. In some embodiments, the offer is transmitted to a player mobile device corresponding to an event such as an indication that the player is leaving the gaming establishment.

In some embodiments, the player account server 70 may receive 210 an acceptance of the offer via the redemption device 71. In response the player account server 70 may transfer (block 212) value to an account that corresponds to the player and the predefined vendor 72. In some embodiments, the value transferred includes a portion of the cash balance and the bonus portion. Some embodiments provide that transferring the value does not occur until the player actually purchases the good and/or service from the predefined vendor 72. In some embodiments, the player account server 70 may notify 214 the vendor 72 of the acceptance of the offer and/or of the transfer of the value. In some embodiments, the vendor 72 has already arranged with the player account server 70 that a given code will correspond to a discount. In such embodiments, the player account server 70 may provide the player with the code based on acceptance of the bonus offer without notifying the vendor 72.

In some embodiments, a player may start a gaming session on a particular EGM 100 (or table game 101) and the EGM 100 may record the wagering activities corresponding to the gaming session. At the end of the gaming session, the player may receive a ticket corresponding to the player's remaining balance and/or a carded and/or cardless connect transfer may be made. When the player cashes out, the ticket or other account may have a cash balance and a bonus offer of some percentage of that cash balance. For example, a cash balance of $200 with a ten percent bonus offer would provide a combined balance of $220, that may be redeemed at all vendors and/or merchants at the gaming establishment or property. In such embodiments, the player may redeem for the cash balance or redeem at the vendors and merchants for the combined value.

In some embodiments, a player staying at a casino or other gaming establishment property may have winnings stored in a carded and/or cardless funds account. Once the gaming establishment receives an indication that the player is leaving, they may transmit an offer to the player to redeem all or part of the money in the funds account into an online merchant gift card that includes the cash balance plus a bonus portion. Some embodiments provide the player may be offered to redeem some of the cash balance into a voucher for use with another commercial entity. For example, the voucher may include a fixed value and/or a percentage-based discount.

In embodiments in which a player may combine a balance from a player funds account and a bonus portion to spend at the predefined vendors 72, the vendors 72 may provide additional value to bonus or promotional funds. Some embodiments provide vendors 72 may incentivize the player to purchase specific items by providing yet additional bonus portions for the player to spend.

Some embodiments provide that an offer made to the player at the time of cashout may have a decreasing value relative to elapsed time after the offer is transmitted. For example, the optimal value may be provided at the time the offer is made with the information that the value of the offer will decrease over time.

Figure 3:
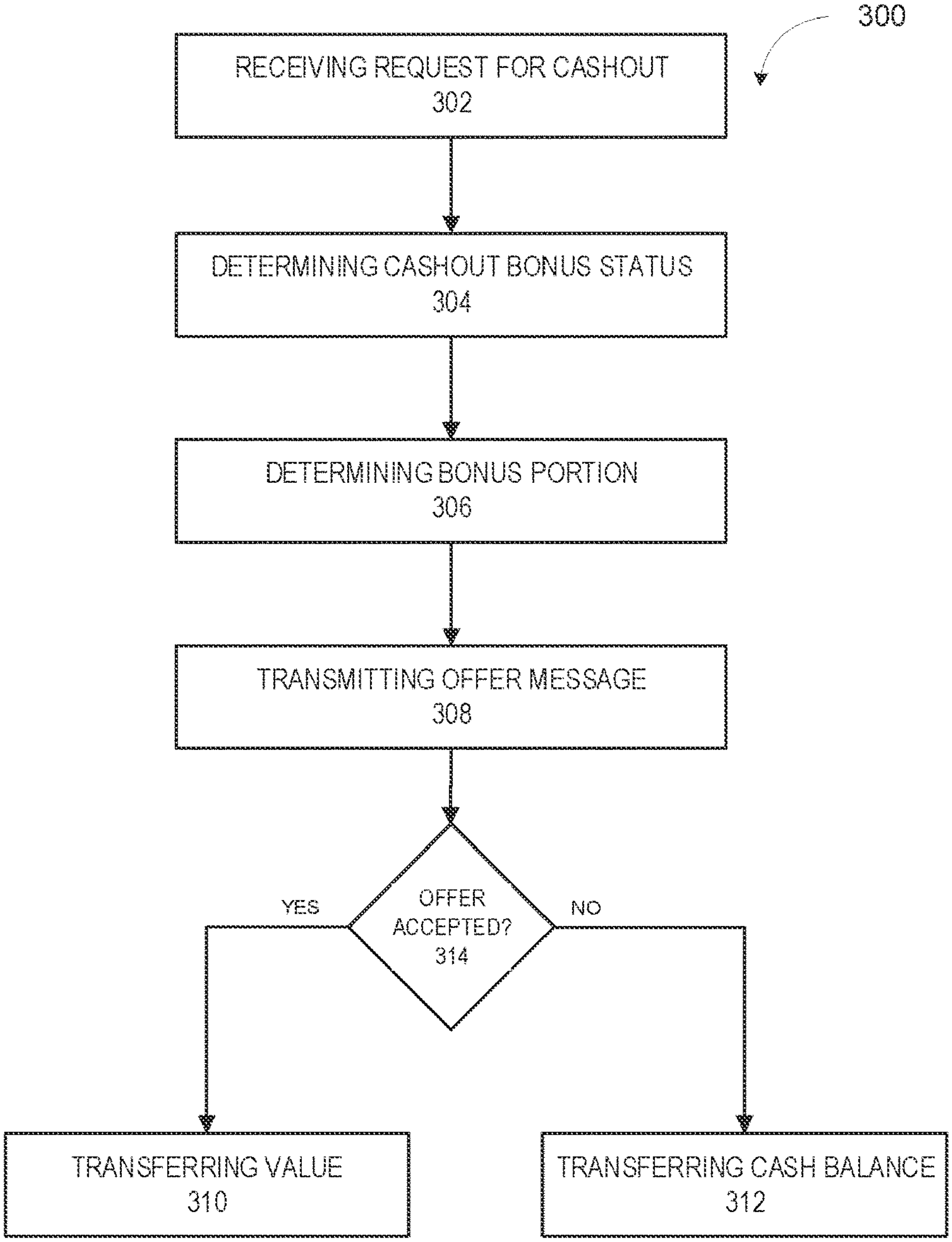
FIGS. 3-4 are flowcharts illustrating operations of systems/methods according to some embodiments.

Reference is now made to FIG. 3, which is a flowchart illustrating operations of systems/methods according to some embodiments. Operations may include receiving a request for cashout (block 302). In some embodiments, the request may be received via a redemption device that the player may interact with to request the cashout. Examples of redemption devices include kiosks, cash windows, and/or mobile devices that are associated with the player. The cashout may correspond to a cash balance of the player at the end of a gaming session that is provided by a game provider. For example, the cash balance may include a balance in an account that is associated with the game provider and that is accessible via a player mobile electronic device.

In some embodiments, a request may be received via redemption device that includes a sports betting terminal, sports betting kiosk and/or an EGM that may receive sports related wagers from the player. Some embodiments provide the sports betting terminal, the sports betting kiosk and/or the EGM may allow the player to redeem sports wagers such that the cashout may apply to sports wagers.

In some embodiments, a request may be received via a terminal that receives wagers and win money corresponding to live table games, such as dice and/or card games, among others. In some embodiments, a player mobile electronic device may include an application that allows for casino play, table games and/or sports wagering.

Operations may include determine a cashout bonus status that corresponds to the player and to the gaming session (block 304). In some embodiments, the cashout bonus status is based on player wagering activity during a recent gaming session. Player wagering activity may include any amounts wagered, average wager amounts, time at which these wagers are placed, and/or wager denominations, among others. Some embodiments provide that the cashout bonus status may be based on historical gaming activity that may be tracked by a player tracking server.

Operations further include determining a bonus portion (block 306). The bonus portion may be based on the cashout bonus status and the cash balance. In some embodiments, the bonus portion may be based on a percentage of the cash balance. In some embodiments, the bonus portion includes discount that is available to be applied to purchases made using the cash balance in the account.

Operations include transmitting an offer message to a device that is viewable by the player (block 308). Some embodiments provide that the offer message includes an offer to allocate a value of a portion of the bonus portion and the cash balance to be spent with a predefined vendor that is associated with a game provider and/or that provided a game being executed to provide the gaming session. In some embodiments, the vendor may be associated with the game provider by proximity, such as being located at the same property.

Some embodiments provide that the gaming session occurs at a gaming provider physical location and the predefined vendor is a merchant located at the same physical location. For example, the gaming provider physical location and the merchant location may be in the same building and/or building group.

In some embodiments, the offer includes an offer to the player to redeem the combined value for a vendor gift card that is spendable with the predefined vendor. The bonus portion may include a percentage of an amount of the cash balance that the player designates for the vendor gift card. In some embodiments, the bonus portion includes a percentage discount corresponding an amount spent in a purchase using the combined value.

In some embodiments, the offer message is transmitted in response to receiving the request and a value of the bonus portion decreases based on time elapsing before the offer is accepted. Some embodiments provide that an alert message may be transmitted to the player indicating that the value of the bonus portion will decrease based on elapsed time. In some embodiments, the offer may expire after a given time interval has passed.

If the offer is accepted (block 314), operations may include transferring the value to an account that is associated with the player and/or the predefined vendor (block 310). In some embodiments, the combined value includes the bonus portion and at least a portion of the cash balance.

In some embodiments, in response to receiving the request for cashout, operations may further include transmitting data that causes the printing of a cashout ticket that includes a code for redeeming the cash balance and for redeeming the offer to the player to allocate the bonus portion and the cash balance. In some embodiments, operations include transmitting data that corresponds to payout of the cash balance without the bonus portion in response to the player redeeming the cashout ticket for the cash balance. Alternatively, operations may include transmitting data that corresponds to the combined value to the player responsive to the player redeeming the cashout ticket at the predefined vendor.

In some embodiments, the bonus portion is a first bonus portion that is based on the first offer. Operations may include transmitting a second offer to the player to receive a second bonus portion that corresponds to the player using the cashout ticket to make a purchase of specific merchandise from the predefined vendor. In some embodiments, the value corresponding to the second offer may be provided by the vendor to incentivize the player to make specific purchases.

In some embodiments, the player chooses to reject the offer. In such embodiments, the cash balance without the bonus portion without the bonus portion may be transferred to an account that is associated with the player (block 312) and/or the cash balance may be dispensed in the form of cash.

Figure 4:
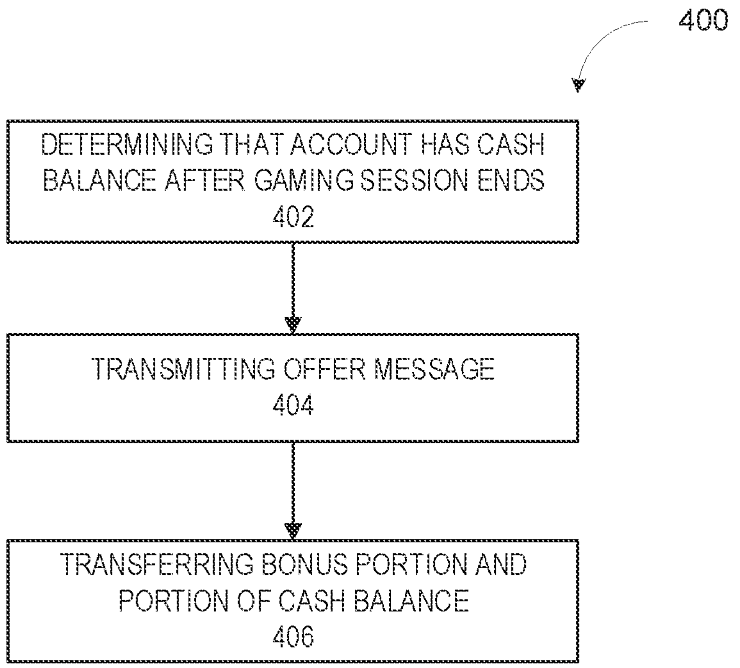

Reference is now made to FIG. 4, which is a flowchart illustrating operations of systems/methods according to some embodiments. Operations may include determining that an account that is associated with a player includes a cash balance after a gaming session that is provided by a game provider is ended (block 402). An offer message may be transmitted to a device that is viewable by the player (block 404). In some embodiments, the offer message includes an offer to allocate a bonus portion and a portion of the cash balance to be spent with a predefined vendor. Some embodiments provide that the predefined vendor is associated with the game provider. For example, the predefined vendor may be located in the same physical property as a casino that provides the games.

In some embodiments, in response to receiving an acceptance of the offer from the player, the bonus portion and at least a portion of the cash balance may be transferred to a predefined vendor account that is associated with the player. In some embodiments, the transferring is performed in advance of the player making a purchase with the predefined vendor while in some other embodiments the transferring is not performed until the purchasing activity is performed.

Figure 5:
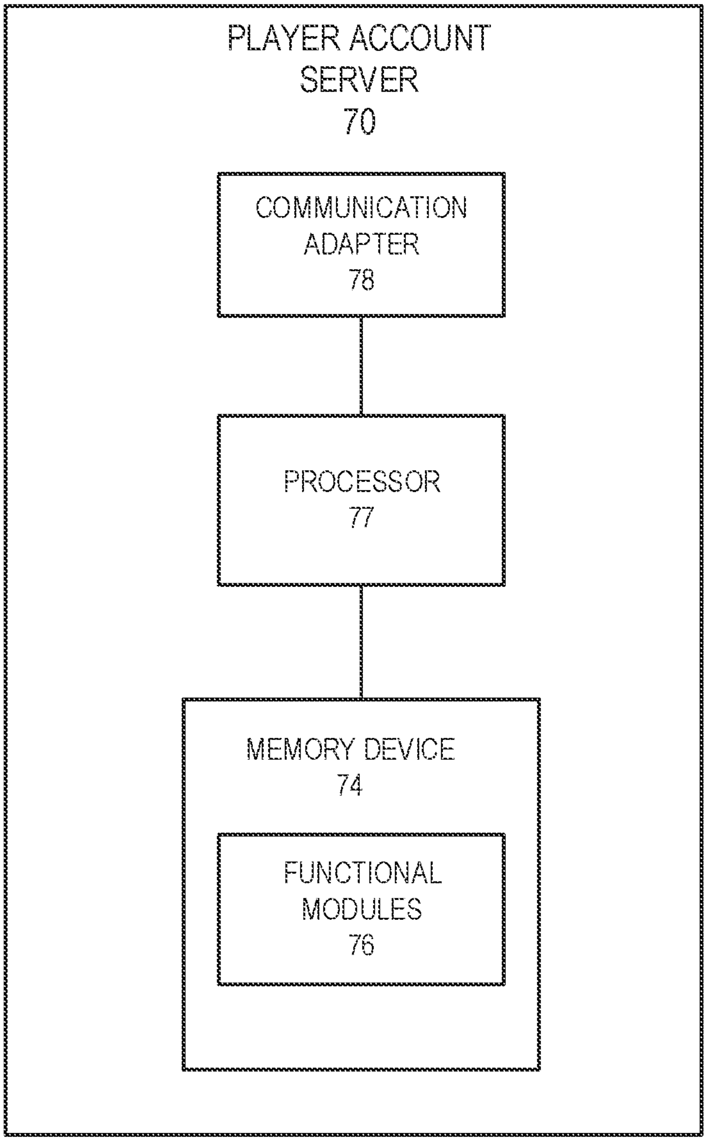
FIG. 5 is a schematic block diagram illustrating an electronic configuration for a player account server according to some embodiments.

Reference is now made to FIG. 5, which is a block diagram that illustrates various components of a player account server 70 according to some embodiments. As shown in FIG. 5, the player account server 70 may include a processor 77 that controls operations of the player account server 70. Although illustrated as a single processor, multiple special purpose and/or general purpose processors and/or processor cores may be provided in the player account server 70. For example, the player account server 70 may include one or more of a video processor, a signal processor, a sound processor and/or a communication controller that performs one or more control functions within the player account server 70. The processor 77 may be variously referred to as a "controller," "microcontroller," "microprocessor" or simply a "computer." The processor may further include one or more application-specific integrated circuits (ASICs).

Various components of the player account server 70 are illustrated in FIG. 6 as being connected to the processor 77. It will be appreciated that the components may be connected to the processor 77 through a system bus, a communication bus and controller, such as a USB controller and USB bus, a network interface, or any other suitable type of connection.

The player account server 70 further includes a memory device 74 that stores one or more functional modules 76 for performing the operations described above.

The memory device 74 may store program code and instructions, executable by the processor 77, to control the player account server 70. The memory device 74 may include random access memory (RAM), which can include non-volatile RAM (NVRAM), magnetic RAM (ARAM), ferroelectric RAM (FeRAM) and other forms as commonly understood in the gaming industry. In some embodiments, the memory device 74 may include read only memory (ROM). In some embodiments, the memory device 74 may include flash memory and/or EEPROM (electrically erasable programmable read only memory). Any other suitable magnetic, optical and/or semiconductor memory may operate in conjunction with the gaming device disclosed herein.

The player account server 70 may include a communication adapter 78 that enables the player account server 70 to communicate with remote devices, such as EGMs 100 and/or a player tracking server 45 (FIG. 1) over a wired and/or wireless communication network, such as a local area network (LAN), wide area network (WAN), cellular communication network, or other data communication network.

The player account server 70 may include one or more internal or external communication ports that enable the processor 77 to communicate with and to operate with internal or external peripheral devices, such as display screens, keypads, mass storage devices, microphones, speakers, and wireless communication devices. In some embodiments, internal or external peripheral devices may communicate with the processor through a universal serial bus (USB) hub (not shown) connected to the processor 77.

Although illustrated and discussed as a separate device, some embodiments provide that the player account server 70 and some or all of the components therein may be implemented in the central controller 40 (FIG. 1) and/or the player tracking server 45 (FIG. 1).

In various embodiments, the gaming system includes one or more player tracking systems under control of the player tracking server 45 (FIG. 1). Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device.

As noted above, a player's progress or status can be saved in other ways besides using a player tracking system, such as by generating, when the player cashes out, a ticket including a printed code, such as a bar code or QR code, that identifies the player's session. When the player wants to continue the game, the player may insert the ticket including the printed code into an EGM 100 (which may or may not be the same EGM 100 from which the ticket was issued). The EGM 100 reads the printed code and retrieves the player's status in response to the printed code.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more EGMs; and/or (c) one or more personal EGMs, such as desktop computers, laptop computers, tablet computers or computing devices, personal digital assistants (PDAs), mobile telephones such as smart phones, and other mobile computing devices.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In some embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central controller, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

In the above-description of various embodiments, various aspects may be illustrated and described herein in any of a number of patentable classes or contexts including any new and useful process, machine, manufacture, or composition of matter, or any new and useful improvement thereof. Accordingly, various embodiments described herein may be implemented entirely by hardware, entirely by software (including firmware, resident software, micro-code, etc.) or by combining software and hardware implementation that may all generally be referred to herein as a "circuit," "module," "component," or "system." Furthermore, various embodiments described herein may take the form of a computer program product comprising one or more computer readable media having computer readable program code embodied thereon.

Any combination of one or more computer readable media may be used. The computer readable media may be a computer readable signal medium or a non-transitory computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible non-transitory medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Various embodiments were described herein with reference to flowchart illustrations and/or block diagrams of methods, apparatus (systems), devices and computer program products according to various embodiments described herein. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a non-transitory computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

The foregoing is illustrative of the present inventive concept and is not to be construed as limiting thereof. Although a few embodiments of the present inventive concept have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. Therefore, it is to be understood that the foregoing is illustrative of the present inventive concept and is not to be construed as limited to the embodiments disclosed herein, and that modifications to the disclosed embodiments, as well as other embodiments, are intended to be included within the scope of the appended claims. The present inventive concept is defined by the following claims.

What is claimed is:

1. A device comprising:

a processor circuit; and a memory coupled to the processor circuit, the memory comprising machine-readable instructions that, when executed by the processor circuit, cause the processor circuit to:

determine, using the processor circuit, that an account that is associated with a player comprises a cash balance after a gaming session that is provided by a game provider is ended;

automatically transmit, using the processor circuit, an offer message to a device that is viewable by the player that comprises an offer to allocate a bonus portion and a portion of the cash balance to be spent with a predefined vendor that is associated with the game provider; and responsive to receiving an acceptance of the offer from the player, the processor circuit is further caused to automatically transfer, using the processor circuit, the bonus portion and a portion of the cash balance to a predefined vendor account that is associated with the player, wherein the offer message is generated with a destination network address for a player mobile, wherein the gaming session occurs at a gaming provider physical location, wherein the processor circuit further receives, from the player, at an end of the gaming session, a request for cashout, and wherein responsive to receiving the request for cashout, the processor circuit is further caused to transmit data causing printing of a cashout ticket that comprises a code for redeeming the cash.

2. The device of claim 1, wherein the processor circuit is caused to define the offer as an offer to the player to redeem a value for a predefined vendor gift card that is spendable with the predefined vendor.

3. The device of claim 2, wherein the processor circuit is caused to define the bonus portion as a percentage of an amount of the cash balance that the player designates for the predefined vendor gift card.

4. The device of claim 2, wherein the processor circuit is caused to define the bonus portion as a percentage discount corresponding an amount spent in a purchase using a combined value.

5. The device of claim 1, wherein responsive to receiving a rejection of the offer from the player, the processor circuit is further caused to transfer the cash balance without the bonus portion to an account that is associated with the player.

6. The device of claim 1, wherein the processor circuit is further caused to determine a cashout bonus status based on player wagering activity during the gaming session and historical gaming activity that is tracked by a player tracking server, and wherein the player wagering activity comprises amounts wagered per wager and total amount wagered during the gaming session.

7. The device of claim 1, wherein the processor circuit further receives, from the player, at an end of the gaming session, a request for cashout of the cash balance of the player, and wherein responsive to receiving the request for cashout, the processor circuit is further caused to transmit data causing printing of a cashout ticket that comprises a code for redeeming the cash balance and the offer to the player to allocate the value of a portion of the bonus portion and the cash balance.

8. The device of claim 7, wherein the processor circuit is further caused to transmit data that corresponds to payout of the cash balance without the bonus portion responsive to the player redeeming the cashout ticket for the cash balance.

9. The device of claim 7, wherein the bonus portion comprises a first bonus portion and the offer comprises a first offer, wherein the processor circuit is further caused to transmit a second offer to the player to receive a second bonus portion that will be transferred to the account when it is subsequently determined that the player is using the cashout ticket to make a purchase of specific merchandise from the predefined vendor.

10. The device of claim 1, wherein the cash balance comprises a balance in an account that is associated with the game provider that provided a game being executed to provide the gaming session, and that is accessible via a player mobile electronic device.

11. The device of claim 1, wherein a cardless account balance that is associated with the game provider that provided a game being executed to provide the gaming session, and that is accessible to the player via a player mobile electronic device comprises a value of a portion of the cash balance and the bonus portion, wherein the bonus portion comprises a first bonus portion and the offer comprises a first offer, and wherein the processor circuit is further caused to transmit a second offer to the player to receive a second bonus portion that will be transferred to the account when it is subsequently determined that the player is making a purchase of specific merchandise from the predefined vendor.

12. The device of claim 1, wherein transmitting the offer message is performed responsive to receiving, from the player, a request for cashout of the cash balance of the player, and wherein the processor circuit decreases a value of the bonus portion responsive to a first time interval elapsing after the offer message is transmitted and before receiving the acceptance of the offer.

13. The device of claim 12, wherein the processor circuit is further caused to transmit an alert message to the player indicating that the value of the bonus portion will decrease responsive to a second time interval, which is less than the first time interval, elapsing after the offer message is transmitted and before receiving the acceptance of the offer.

14. The device of claim 1, wherein the offer message is generated with a destination network address for a player mobile electronic device that is operating a portion of the gaming session.

* * * * *